United States Patent [19]

Sato

[11] Patent Number: 4,612,200

[45] Date of Patent: Sep. 16, 1986

[54] METHOD FOR PRODUCING REFRESHABLE DRY FOOD

[75] Inventor: Masami Sato, 29-3-401, Minamidai 2-Chome, Nakano-Ku, Tokyo, Japan

[73] Assignees: Stephano & Co., Ltd.; Masami Sato, both of Yokohama, Japan

[21] Appl. No.: 769,721

[22] Filed: Aug. 27, 1985

Related U.S. Application Data

[63] Continuation-in-part of Ser. No. 570,848, Jan. 16, 1984, abandoned.

[30] Foreign Application Priority Data

Nov. 4, 1983 [JP] Japan ................ 58-205897

[51] Int. Cl.⁴ .................... A23B 4/06; F26B 5/06
[52] U.S. Cl. ................................. 426/242; 34/5; 426/385
[58] Field of Search ................ 426/385, 241, 242; 34/5, 92; 219/349, 354

[56] References Cited

U.S. PATENT DOCUMENTS 3,271,874 9/1966 Oppenheimer ................ 34/5
3,883,958 5/1975 Filipe ............................ 34/92

Primary Examiner—George Yeung
Attorney, Agent, or Firm—Spencer & Frank

[57] ABSTRACT

A method of producing refreshable dry food comprises the step of placing unfrozen raw food in a vacuum chamber; reducing the pressure in the chamber to a value within the range 1 Torr to 5 Torr thereby reducing the temperature to a value within the range of −10° C. to 0° C.; irradiating the food with infrared energy having a wavelength of at least 5 microns; and terminating the irradiation when the food reaches a temperature in the range +5° C. to +40° C. whereby the food is dried before its texture is adversely affected.

8 Claims, 3 Drawing Figures

METHOD FOR PRODUCING REFRESHABLE DRY FOOD

This application is a continuation-in-part of Ser. No. 570,848, filed Jan. 16, 1984, now abandoned.

BACKGROUND OF THE INVENTION

Field of the Invention and Related Art Statement

This invention relates to a method for producing refreshable dry food, and more particularly to a method for vacuum-drying edible raw food such as beef, pork, mutton, and the like; fishes and shellfishes such as raw shrimp, adductor muscle, fish meat and the like; vegetables such as raw potato, raw onion and the like; and edible wild plants such as mushrooms and the like (hereinafter referred to as other food) at a low temperature of −10° C. to 0° C. in a semi-frozen state in such a manner that the thus dried meat or other food is refreshable substantially to the state of raw meat or other fresh food before drying.

A number of methods for preserving edible meat or other food by drying have been known: namely, non-restorable drying methods such as natural drying with solar energy and drying by blowing hot air over the food, and semi-restorable methods such as freeze-drying under vacuum conditions. However, none of the conventional methods for drying edible meat or other food produce dry meat or other food which can be restored to the quality equivalent to that of fresh meat or other food before drying. More particularly, with the conventional method of drying edible meat or other food, the inside texture of the fresh meat or other food is damaged in the process of freeze-drying, so that it is almost impossible to restore the thus dried meat or other dry food to conditions which closely resemble fresh meat or other fresh food. Thus, the use of dry meat or other dry food prepared by conventional methods has been limited to those which do not require restoration to fresh meat or other fresh food, such as those for canning.

Accordingly, there is a demand for a method for producing refreshable dry meat or other dry food which upon rehydration closely resembles fresh meat or other fresh food (to be referred to as "refreshable dry food" hereinafter) If any practicable methods for producing refreshable dry food are found, preservation of edible dry food for a long period of time would become possible and the need for refrigerators and cold storage facilities would be greatly curtailed. Besides, the refreshable dry food would weigh only about one third of fresh food, so that transportation and storage of food would be simplified to a considerable extent. Further, preservation of such refreshable dry food by vacuum packing or nitrogen packing with a highly airtight film would provide one of the most useful preserved food stuffs.

SUMMARY OF THE INVENTION

Therefore, an object of the present invention is to meet the above-mentioned demand, by providing a method of producing refreshable dry food by vacuum-drying edible raw food, i.e., meat such as beef, pork, mutton, and the like; fish and shellfish such as raw shrimp, adductor muscle, fish meat; vegetables such as raw potatoes, raw onions and edible wild plants such as raw mushrooms and the like at a low temperature of −10° C. to 0° C. at the reduced pressure of 1–5 Torr, so that the thus dried food can be restored to fresh food which is substantially the same as fresh food in terms of flavor, toothsomeness, appearance, texture, and the like.

To fulfill the above object, I have invented a method of producing refreshable dry food which comprises the steps of placing unfrozen raw food in a vacuum chamber;

reducing the pressure in the chamber to a value within the range 1 Torr to 5.0 Torr, thereby reducing the temperature to a value within the range of 0° C. to −10° C.;

irradiating the food with infrared energy having a wavelength of at least 5 microns; and terminating the irradiation when the meat reaches a temperature in the range +20° C. to +40° C. whereby the food is dried before its texture is adversely affected.

In a preferred embodiment of the method of producing refreshable dry meat according to the invention, the above-mentioned vacuum-drying is effected by keeping the temperature of the infrared ray heater in a range of +25° C. to +200° C. depending on the distance from the heater to the raw food, the kind of raw food, and the desired duration of drying, while maintaining the temperature of the food in a range of 0° C. to −10° C. during the first vacuum freeze-drying by evacuating the vacuum chamber to a value within the range 1 Torr to 5 Torr, preferably 2 Torr to 5 Torr.

In another embodiment of the method of producing refreshable dry meat according to the invention, the above-mentioned first vacuum freeze-drying is followed by a stage of second vacuum freeze-drying, and the above-mentioned application of the infrared rays from the infrared ray heater is terminated when the temperature of the food is at +5° C. to 40° C. in the second vacuum freeze-drying stage. The infrared rays emanating from the infrared heater used in carrying out the method of this invention have a wavelength of at least 5 microns.

BRIEF DESCRIPTION OF THE DRAWINGS

For a better understanding of the invention, reference is made to the accompanying drawings, in which.

Figure 1:
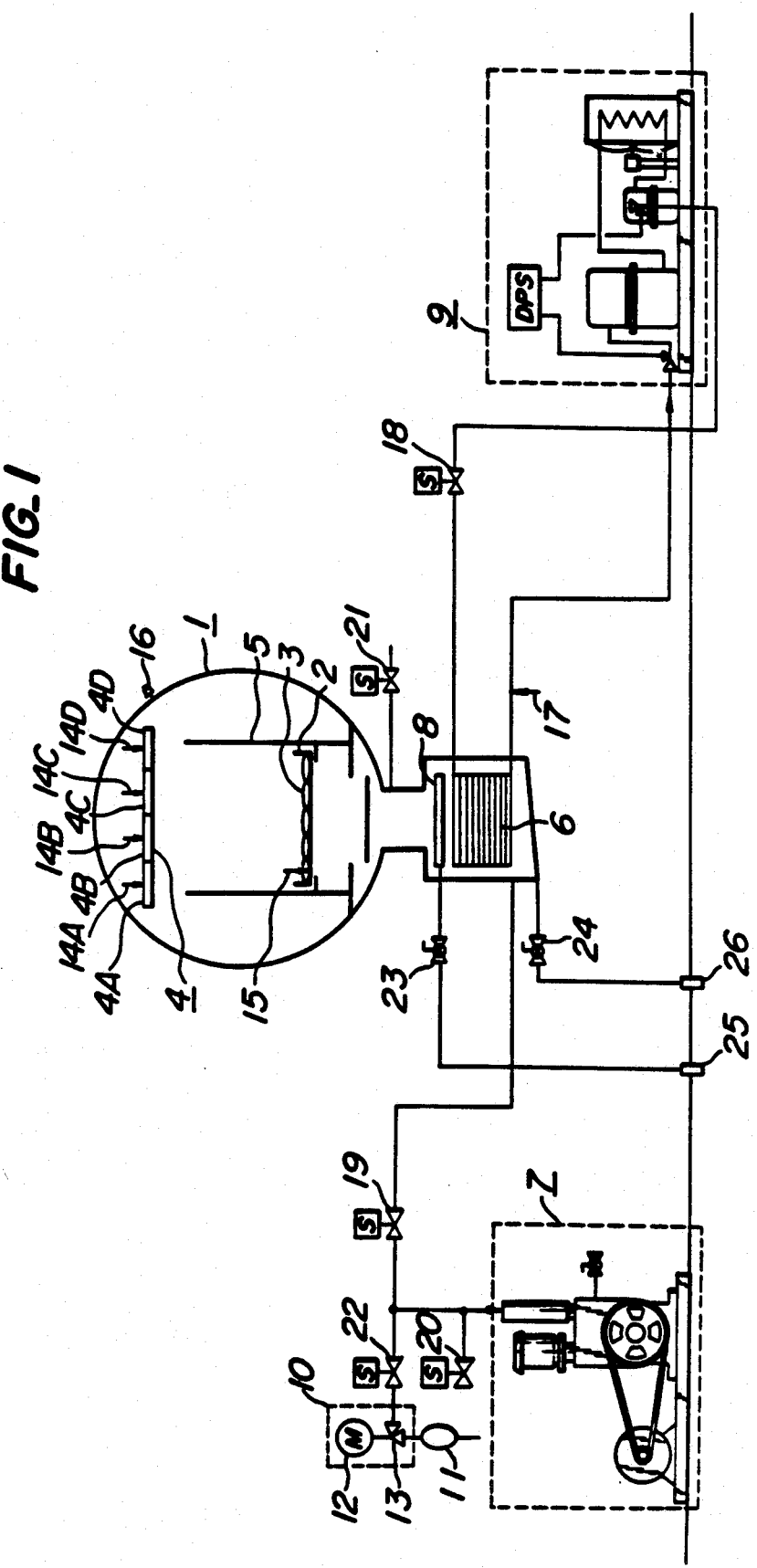
FIG. 1 is a schematic diagram which shows the structure of a vacuum-drying equipment having an infrared ray heater suitable for effecting the method according to the present invention.

Throughout different views of the drawings, 1 is a vacuum chamber, 2 is a tray, 3 is the food to be dried, 4 is an infrared ray heater, 4A through 4D are infrared ray plate heaters, 5 is a holder frame for the tray, 6 is a cold trap, 7 is an oil rotary vacuum pump, 8 is a water spray pipe, 9 is a small hermetic refrigerator, 10 is an automatic vacuum regulator, 11 is an air filter, 12 is a reversible motor, 13 is a vacuum pressure regulator valve, 14A through 14D are heating-temperature sensors, 15 is an object-temperature sensor, 16 is a vacuum gauge, 17 is a cooling-temperature sensor, 18 is a cold trap coolant valve, 19 is an evacuating valve, 20 is a vacuum pump leak valve, 21 is a vacuum chamber leak valve, 22 is a vacuum pressure regulator valve, 23 is an ice-melting water valve, 24 is a drain valve, 25 is an inlet for ice-melting water, 26 is a drain hole, 27 is a Pirani gauge, 28 is a control means, 29 is a recorder, and 30 through 34 are temperature regulators.

DESCRIPTION OF THE PREFERRED EMBODIMENTS

The method of the present invention constitutes vacuum-drying processes at a semi-freezing temperature, or freeze-drying processes under vacuum conditions. As is well known in the prior art describing such processes, the object to be dried or dehydrated is frozen at a temperature in a range of for example −30° C. to −40° C. It is then placed in a vacuum vessel so as to apply heat necessary for evaporation of the moisture under vacuum conditions, whereby the object is dried by direct sublimation of the moisture therefrom. This results in the texture being changed or destroyed because of the freezing at −30° C. to −40° C. or at least −20° C.

In the present invention, the food to be dried is maintained in a range of −10° C. to 0° C. in semi-freezing state and under a vacuum condition of 1-5 Torr. Further, in the method of the invention, an infrared ray heater emitting infrared rays having a wavelength of at least 5 microns is used as the heat source for evaporation of the moisture from the frozen object (i.e., the food to be dried) in the above-mentioned freeze-drying process under vacuum conditions.

More particularly, noting that the principle for drying used in the freeze-drying process under vacuum conditions is most suitable for drying raw meat, I have carried out a series of tests to improve the method. As a result, it was learned that when an infrared ray heater is used as a heat source for heating the frozen raw meat, especially when infrared rays with a wavelength of longer than 5-6 $\mu$m were irradiated onto frozen meat for uniform heating from the inside thereof, the vacuum-drying of such frozen meat produced refreshable dry meat which could be restored to substantially the same quality as that of the original fresh meat before drying. The present invention is based on these findings.

In one of the preferred embodiments of the method according to the present invention, the following operating conditions of the freeze-drying process are favorable: namely, the freezing temperature of the edible raw food to be dried during a first drying stage is in the range of −10° C. to 0° C., preferably −10° C. to −5° C. for meat and −5° C. to 0° C. for other food; and the heating temperature of the infrared ray heater is in a range of +5° C. to +120° C. depending on the kind of meat or food, the desired duration of drying, and the distance from the infrared ray heater to the meat or food; and the vacuum pressure and temperature in the vacuum chamber during the first drying stage is in a range of 1 Torr to 5 Torr and −10° C. to 0° C., respectively.

During the first drying stage of the method according to the present invention, the energy of the electromagnetic waves from the infrared ray heater are all consumed as latent heat for evaporation of the moisture of the raw meat or other raw food. Thus, the temperature of the meat or other food is not raised during the first drying stage, and the drying operation proceeds while keeping the meat at the freezing temperature as mentioned above.

When the moisture content of the meat or other food is reduced to a certain level, the operation enters into a second drying stage, in which a part of the energy of the electromagnetic waves from the infrared ray heater is used as the sensible heat for gradually raising the temperature of the meat or other food. When the moisture content of the meat or other food reaches a certain equilibrium point, all of the energy in the electromagnetic waves from the infrared ray heater contributes to the temperature rise of the meat or other food.

To avoid any change of the texture of the fresh meat or the food being dried, the irradiation of the infrared rays onto the meat or other food is stopped when the temperature of the meat or other food is raised to a temperature which is high enough for satisfactory drying but low enough not to cause detrimental effect on the texture of the fresh meat or other food, such as dissolution and denaturing of the protein contained in the meat, which temperature is for instance in the range of +20° C. to +40° C. Termination of the irradiation may be effected by interrupting the power supply to the infrared ray heater. The heating time necessary for achieving the satisfactory drying of the meat varies considerably depending on various factors such as the size of the equipment used for the drying, the distance from the infrared ray heater to the meat, the heating temperature of the infrared ray heater, the kind and thickness of the meat, and the like. In the examples to be described hereinafter, the heating time was about 8–12 hours.

The weight of the dry meat produced by the method of the invention was about one third that of the fresh meat before drying, and the dry meat thus produced was restored to substantially the same fresh conditions as before drying simply by dipping or immersing the dry meat in water at room temperature. The dry meat absorbs moisture when dipped in water at room temperature and substantially restores the original texture.

EXAMPLES 1–3

A piece of unfrozen fresh meat was placed on a tray carried by a shelf disposed in a vacuum chamber having an infrared ray heater facing the shelf, and the meat was semi-frozen at −10° C. ∼ −5° C. in the reduced pressure of 1 Torr to 5 Torr. The inside of the vacuum chamber was evacuated to a desired degree of vacuum by a vacuum pump. The meat was then freeze-dried under vacuum conditions by using the infrared ray heater. Details of the drying process used will be described hereinafter. A part of the result is shown in Table 1.

In the Examples of Table 1, the infrared ray heater in the vacuum chamber was formed of four infrared ray plate heaters disposed side-by-side. Each of the plate heaters had a surface area of 300 mm (width) × 140 mm (length) and a rated capacity of 400 W. In each of the Examples of Table 1, ten pieces of meat to be dried were placed on an iron tray and loaded in the vacuum chamber, and each piece of meat was a beef loaf with a surface area of about 10 cm² and a thickness of about 2 cm. The meat disposed in the vacuum chamber was semi-frozen in the reduced pressure of 1 Torr to 5 Torr, and when the average temperature of the beef load reached a predetermined freezing temperature of −10° C., the infrared ray heater was energized to heat the meat at a predetermined heating temperature.

In each of the Examples, after the interruption of the power supply to the infrared ray heater, the meat thus dried was left under vacuum conditions for a while, and then the pressure in the vacuum chamber was raised to atmospheric pressure to remove the dry meat to the outside. The dry meat of the three Examples weighed about one third of that before drying, and the dried conditions of the dry meat was good.

TABLE 1

| Item | Example 1 | Example 2 | Example 3 |
|---|---|---|---|
| Meat temperature during freeze-drying | −10° C. | −10° C. | −10° C. |
| Heating temperature of infrared ray heater | +75° C. | +50° C. | +100° C. 4 hrs. later +75° C. |
| Distance from heater to meat | 20 cm | 30 cm | 15 cm |
| Specimen temperature* | +25° C. | +20° C. | +25° C. |
| Pressure in the vacuum chamber | 2 Torr | 3 Torr | 1–1.8 Torr |
| Cooling temperature of cold trap | −35° C. | −35° C. | −28° C. |
| Drying time | 7 hours | 8 hours | 6 hours |

Note:
*"Specimen temperature" refers to that temperature of the meat at which heating in the drying stage is terminated. The same will apply to the succeeding description.

The drying beef prepared by each of the above Examples was restored by immersing it in water at room temperature for about one hour. With the naked eye, the thus restored beef appeared substantially the same as fresh beef before drying. The restored beef was cooked in the same manner as that of fresh meat and then tasted. The dry meat was found to have substantially the same flavor and toothsomeness as that of fresh meat.

Analysis of the dissolution and denature of protein and the like in the dry beef prepared by Example 1 was carried out, in comparison with that of fresh beef, by a Foundational Juridical Person "JAPAN THERAPEUTIC FOOD ASSOCIATION". The result is shown in Table 2.

More particularly, Table 2 relates to nitrogen content in the meat in general, and more particularly to the measurement concerning presence or absence of water-soluble heat coagulated nitrogen in the Specimens A and B prepared by the method of the invention, which heat coagulated nitrogen should not be contained in the fresh meat. The heat coagulation could occur from nitrogen contained in the fresh beef. Table 2 shows test results of both Specimens prepared by the method of the invention and fresh beef before drying.

TABLE 2

| Specimen | Water-soluble coagulated nitrogen, in % of total nitrogen* |
|---|---|
| Specimen A | 12.0% (13.46 mg/112.1 mg) |
| Specimen B | 11.7% (13.71 mg/117.2 mg) |
| Fresh beef | 13.1% (3.93 mg/29.95 mg) |

Note:
*Bracketed values show water-soluble heat coagulated nitrogen in mg/total nitrogen in mg.

In Table 2, the measured value of the water-soluble coagulated nitrogen for the fresh beef was taken after evaporating the fresh beef for 10 minutes so as to cause heat coagulation.

As can be seen from Table 2, for 100 parts of water-soluble heat coagulated nitrogen contained in the fresh beef and produced upon heating, the mean amount of the water-soluble heat coagulated nitrogen in each of the Specimens A and B produced by the method of the invention was 90.5, so that the Specimens A and B differ only little from the fresh beef. This means that, in either of the Specimens A and B, the protein is almost completely insoluble, so that both Specimens were dried in a state which is substantially close to the fresh meat.

To check the meat texture, the Specimens A and B of Table 2 were immersed overnight in distilled water at room temperature for rehydration thereof, and the rehydrated Specimens were cut into thin flakes by a freeze microtome and dyed by eosine. The following conclusions were reached from examination of the thus dyed flakes of the Specimens.

(1) The microscopic examination showed muscular fiber disposition which was similar to that of the fresh meat, and it was confirmed that no heat coagulated substances were found between adjacent muscular fibers, that no increase of inter-fiber gap due to heat shrinkage of the muscular fibers was noted, and that no dissolution of fat was found.

(2) The naked eye examination showed that both of the Specimens A and B were fully rehydrated so as to retain the moisture in good condition, and that the rehydrated Specimens were hard to tear by hand. If they were forcibly torn off, membranes between the muscular fibers were broken and looked like threads. This means that the muscular fiber texture of the Specimens A and B were about the same as that of the fresh beef.

The results of the above-mentioned chemical analyses and histological examinations provide scientific evidences of the effect of the method of the present invention.

As a result of a large number of experiments with meat, the inventor found that the same effects as those of the Examples 1 through 3 could be obtained by using the following conditions; namely, the heating temperature of the infrared ray heater in a range of +5° C. to +120° C., the freezing temperature of the meat in a range of −5° C. to −10° C., and the degree of vacuum in the vacuum chamber in a range of 1.0 Torr to 5.0 Torr. Thus, the method of the invention is not restricted to Examples 1 through 3 with respect to the production of refreshable dry meat.

Figure 3:
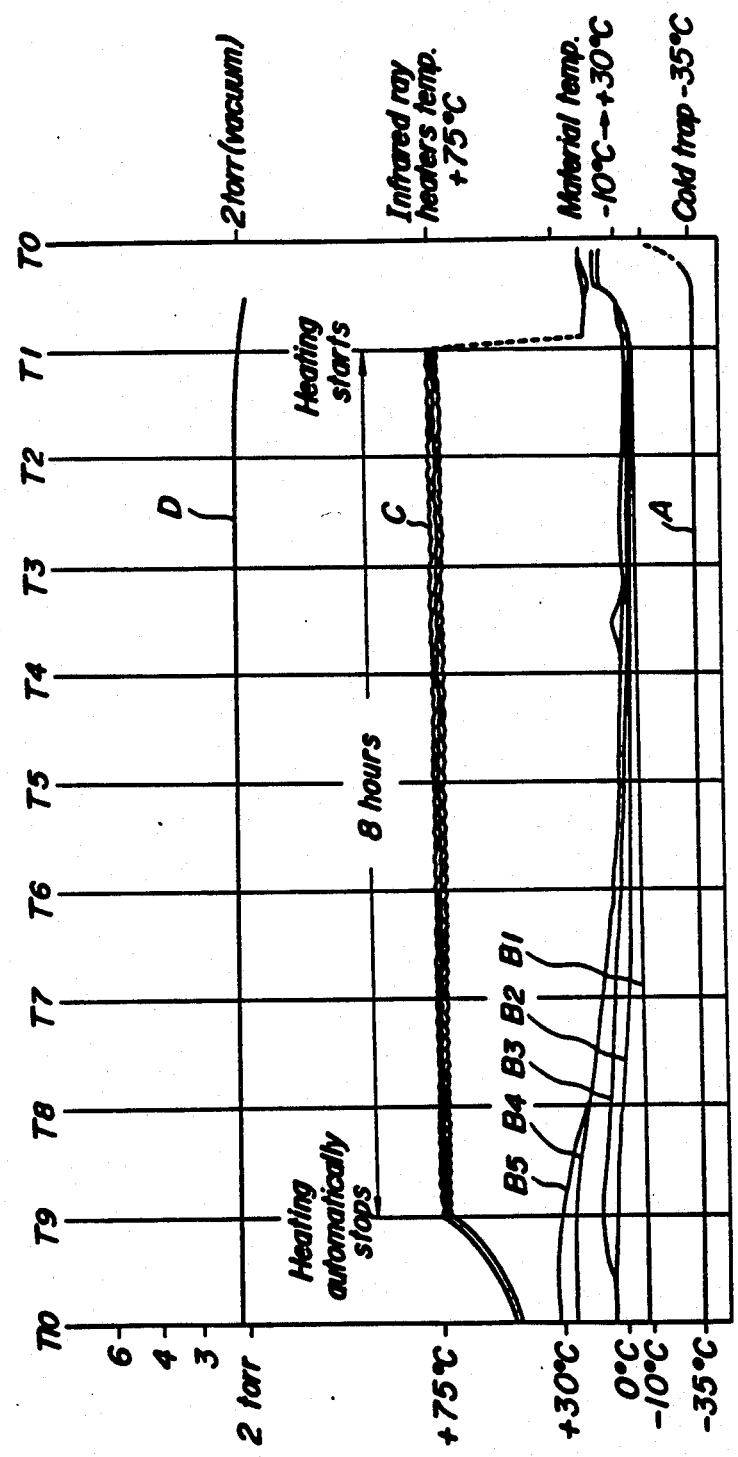
FIG. 3 is an experimental flow chart showing material temperature, cold trap temperature and infrared ray temperature for values of vacuum (Torr) as a function of time.

FIG. 3 is an experimental flow chart showing cold trap temperature, meat temperature, the temperature of the infrared ray heaters, the value of pressure (Torr) and elapsed time for vacuum freeze-drying of the meat. In FIG. 3, curve A shows the cold trap temperature which is maintained at −35° C. Curves $B_1$, $B_2$, $B_3$, $B_4$ and $B_5$ correspond to the temperatures of each portion of the raw meat which are shown to vary from −10° C. to +30° C. Curve C shows the temperature of the infrared ray heater which is controlled to about +75° C. Curve D shows the degree of vacuum which was maintained at 2 Torr. $T_1$ is the time when the vacuum pump was started. $T_2$ is the time when heating was started by energizing the infrared ray heater in the vacuum chamber where the temperature was kept at −10° C. The interval between $T_1$ and $T_5$ is the first drying stage in which all of the infrared ray energy is consumed as latent heat for evaporation of the moisture of the meat, so the temperature of the meat is not raised during this first stage. The interval between $T_5$ and $T_9$ is the second drying stage when the moisture content of the meat is reduced to a certain level, in which a part of the energy of the infrared rays is used as the sensible heat for gradually raising the temperature of the meat. $T_9$ is the time when the temperature of the meat increases from +5° C. to +30° C., and the heating is automatically stopped. The sample is a beef round of thick flank. The results of analysis for the obtained dry meat are as follows:

Results:

| | |
|---|---|
| Water (dry 2 hrs. at 135° C.) | 11.3% |
| Protein (N × 6.25) | 61.5% |
| Protein (dry basis) | 69.3% |
| Fat (Soxhlet extract) | 24.5% |
| Fat (dry basis) | 27.6% |

The inventor further conducted the experiment for foods other than meat to prepare refreshable dry food as follows.

EXAMPLES 4-7

A piece of several kind of fresh food was placed on a tray carried by a shelf disposed in a vacuum chamber having an infrared ray heater facing the shelf, and the food was semi-frozen in the reduced pressure of 3.16 Torr to 5 Torr. The inside of the vacuum chamber was evacuated to a desired degree of vacuum of 1 to 5 Torr by a vacuum pump. The food was then freeze-dried under vacuum conditions during heating by the infrared ray heater and the vacuum chamber temperature maintained at −5° C. to 0° C. Details of the drying process used are described hereinafter. A part of the result is shown in Table 3.

In the Examples of Table 3, the infrared ray heater in the vacuum chamber was formed of four infrared ray plate heaters disposed side by side. Each of the plate heaters had a surface area of 300 mm (width)×140 mm (length) and a rated capacity of 400 W. In each of the Examples of Table 3, pieces of food to be dried were placed on an iron tray and loaded in the vacuum chamber. The food was semi-frozen in the reduced pressure of 3.16 Torr to 5 Torr, and when the average temperature of the food reached a predetermined freezing temperature of −5° C., the infrared ray heater was energized to heat the food at a predetermined heating temperature of −5° C.

In each of the Examples, after the interruption of the power supply to the infrared ray heater, the food thus dried was left under vacuum conditions for a while, and then the pressure in the vacuum chamber was raised to atmospheric pressure to remove the dry food to the outside. The dry food of the three Examples 4–7 weighed about one third of that before drying, and the dried conditions of the dry food were good.

TABLE 3

| Item | Example 4 raw shrimp | Example 5 raw mushroom | Example 6 raw potato | Example 7 raw onion |
|---|---|---|---|---|
| Food temperature during freeze-drying | −3° C. | −1° C. | −2° C. | −2° C. |
| Heating temperature of infrared ray heater | +80° C. | +60° C. | +100° C. | +60° C. |
| Distance from heater to food | 10 cm | 10 cm | 10 cm | 10 cm |
| Specimen temperature* | +10° C. | +20° C. | +20° C. | +20° C. |
| Pressure in the vacuum chamber | 3.5 Torr | 4.3 Torr | 4 Torr | 4 Torr |
| Cooling temperature of cold trap | −35° C. | −35° C. | −35° C. | −35° C. |
| Drying time | 4 hours | 3 hours | 4 hours | 3 hours |

Note:
*"Specimen temperature" refers to that temperature of the food at which heating in the drying stage is ceased. The same will apply to the succeeding description.

The dry food prepared by each of the above Examples was restored by immersing it in water at room temperature for about one hour. Upon inspection with the naked eye, the thus restored food appeared substantially the same as fresh food before drying. The restored food was cooked in the same manner as that of fresh food and then tasted. As a result, the dry food was found to have substantially the same flavor and toothsomeness as that of the fresh food.

Fresh food mentioned in the Examples 4–7 means fish and shellfishes such as raw shrimp, adductor muscle, sea cucumber, squid, young sardine and the like, edible wild plants such as raw mushroom, bamboo sprout and the like, and fresh vegetables such as raw potato, sweet potatoes, carrot, radish, onion and the like.

The preferrable drying conditions for typical foodstuffs selected from the above are as follows.

TABLE 4

| | raw shrimp | raw mushroom | raw potato | raw onion |
|---|---|---|---|---|
| Necessary drying time (hr) | 3–5 | 2–4 | 3–5 | 2–4 |
| Heating temperature of infrared ray heater (°C.) | 70–90 | 50–70 | 90–120 | 50–70 |
| Pressure in the vacuum chamber (Torr) | 3.4 | 4.3 | 4 | 4 |
| Freezing temperature (°C.) | −3° C. | −1° C. | −2° C. | −2° C. |
| Specimen temperature (°C.)* | 10–20 | 10–20 | 10–20 | 10–20 |

Note:
*"Specimen temperature" refers to that temperature of the food at which heating in the drying stage is terminated.

As a result of a large number of experiments with other foods, it has been found that the same effects as those of Examples 4 through 7 could be obtained by using the following conditions; namely, the heating temperature of the infrared ray heater is in a range of +25° C. to +120° C., the freezing temperature of the food in a range of 0° C. to −5° C., and the degree of vacuum in the vacuum chamber in a range of 3.16 Torr to 5 Torr. Thus, the method of the invention is not restricted to the Examples 4 through 7.

An equipment for vacuum-freeze-drying with an infrared ray heater which is most suitable for carrying out the method of the invention will be described.

FIG. 1 schematically illustrates the structure of the equipment for vacuum-freeze-drying of meat according to the invention. A vacuum chamber 1 has a tray 2 which is made of a metal screen, an aluminum plate, or an iron plate. The tray 2 carries the meat or other food 3 to be dried, and an infrared ray heater 4 is mounted within the vacuum chamber 1 so as to face the meat or other food 3 on the tray 2 for heating the meat or other food. In the illustrated embodiment, the heater 4 has four infrared ray plate heaters 4A, 4B, 4C, and 4D disposed side by side. The tray 2 is movably mounted on a holder frame 5, so that the distance from the infrared ray heater 4 to the meat 3 is adjustable. If necessary, a plurality of trays 2 may be mounted on the holder frame 5, for instance one above the other.

A cold trap 6 is disposed in the lower inside portion of the vacuum chamber 1, so as to condense moisture in the vacuum chamber 1, as moisture of the frozen meat or other food 3 is evaporated by the infrared ray energy from the infrared ray heater 4, so that as the meat or other food 3 is dried the moisture from it is collected at the surface of the cold trap 6 by the above condensation. The moisture condensation by the cold trap 6 and evacuation by an oil rotary vacuum pump 7 act to maintain a high degree of vacuum to 1–5 Torr in the vacuum chamber 1. An ice-melting water spray pipe 8 is disposed immediately above the cold trap 6 to spray water toward the cold trap 6 for removing ice formed on the surface thereof with the thus sprayed water. A small hermetic refrigerator 9 disposed outside the vacuum chamber 1 cools the cold trap 6.

An automatic vacuum regulator 10 is connected to the evacuation piping of the oil rotary vacuum pump 7, so as to keep a predetermined desirable degree of vacuum in the vacuum chamber 1. The automatic vacuum regulator 10 includes, for instance, a vacuum pressure regulator valve 13 driven by a reversible motor 12, which valve 13 selectively introduces outside air into the vacuum chamber 1 through an air filter 11 in response to the rotation of the reversible motor 12. The automatic vacuum regulator 10 controls the reversible motor 12 in response to the degree of vacuum in the vacuum chamber 1, so as to maintain the degree of vacuum therein at a desired level.

To check the heating temperature, heating-temperature sensors 14A through 14D are mounted on the individual infrared ray plate heaters 4A through 4D, respectively. A specimen-temperature sensor 15 and object-temperature sensors 15A through 15E are inserted into the meat or other food 3 on the tray 2 at positions best suited for the detection of the temperature of the meat or other food. Further, a vacuum gauge 16 is mounted on the vacuum chamber 1 so as to detect the vacuum pressure therein, and a cooling-temperature sensor 17 is mounted on the piping of the coolant so as to detect the cooling-temperature of the cold trap 6. A series of valves are provided at various portions of the piping; namely, a cold trap valve 18, an evacuating valve 19 for the vacuum chamber 1, a vacuum pump leak valve 20, a vacuum chamber leak valve 21, a vacuum pressure regulator valve 22, an ice-melting water supply valve 23, and a drain valve 24. The ice-melting water is fed through an ice-melting water inlet 25, and the water from the drain valve 24 is discharged through a drain hole 26.

Figure 2:
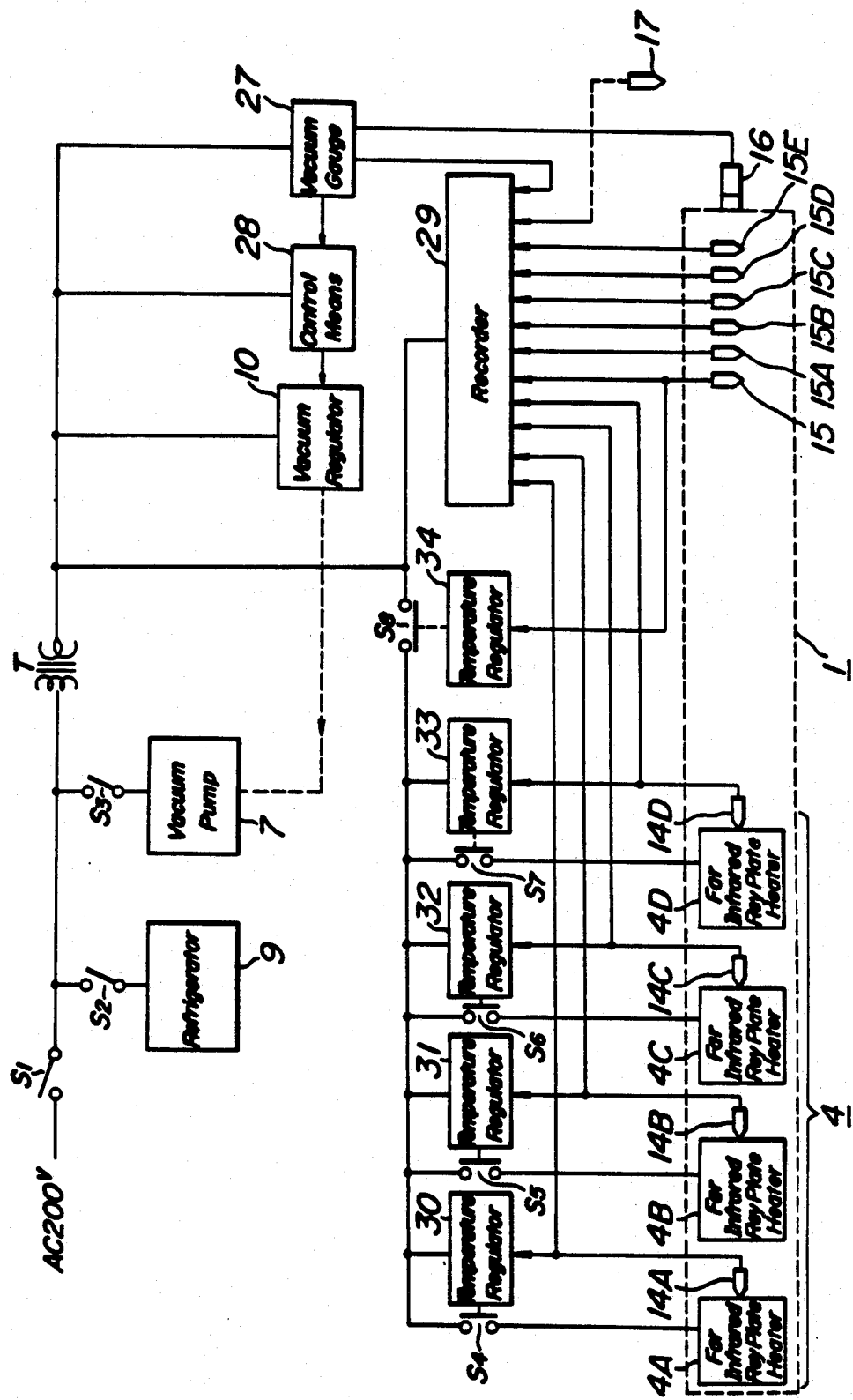
FIG. 2 is a block diagram showing both the electrical and sensor-actuated control system of the equipment of FIG. 1.

FIG. 2 shows a block diagram of the electric power supply system and the control system of the vacuum-freeze-drying equipment of FIG. 1, which equipment has the infrared ray heater and sensors as shown in the figure. A main switch $S_1$ controls the power supply to the control system. Power source switches $S_2$ and $S_3$ control actuation of the refrigerator 9 and the vacuum pump 7, respectively. In the illustrated embodiment, a transformer T with terminal voltages of 200 V/100 V is used between the power circuits and the control circuits. A Pirani gauge 27 has a setting device which can be set for a desired range of the degree of vacuum, and in response to the output signal from the vacuum gauge 16 representing the sensed degree of vacuum, the Pirani gauge 27 produces an information signal indicating whether the sensed degree of vacuum is within or above or below a desired range as stored in the setting device thereof. In response to the information signal from the Pirani gauge 27, a control means 28 connected thereto acts on the automatic vacuum regulator 10, for instance by actuating the reversible motor 12 so as to properly drive the vacuum pressure regulating valve 13 to maintain the desired degree of vacuum in the vacuum chamber 1. The control means 28 may be formed of a series of relays and the vacuum pressure regulating valve 13 may be a needle valve.

Preferably, a recorder 29 is provided, so that a record is kept covering the heating-temperatures of the individual infrared ray plate heaters 4A through 4D, the specimen-temperature and the temperature of the meat 3, the cooling-temperature of the cold trap 6, and the degree of vacuum of the vacuum chamber 1. To this end, the recorder 29 of the illustrated embodiment is connected to the temperature sensors 14A through 14D mounted on the infrared ray plate heaters 4A through 4D, the specimen-temperature sensor 15, the object-temperature sensors 15A through 15E, the cooling-temperature sensor 17 mounted on the cold trap 6, and the Pirani gauge 27.

Temperature regulators 30 through 33 are connected to the heating-temperature sensors 14A through 14D, respectively, so that the regulators 30 through 33 produce ON-OFF signals in response to the output from the above temperature sensors for keeping the infrared ray plate heaters 4A through 4D at desired heating-temperatures. More particularly, each of the temperature regulators 30 through 33 has a setting device on which the desired heating-temperature is selectively set, so that the regulators 30 through 33 compare the sensed temperatures of the corresponding infrared ray heaters 4A through 4D against the desired temperatures set on the setters thereof and produce ON-OFF signals depending on the results of the comparisons. Such ON-OFF signals controls the electromagnetic switches $S_4$ through $S_7$ in the power source circuits of the infrared ray plate heaters 4A through 4D, so as to control heat generation by the heaters in response to the comparisons at the temperature regulators 30 through 33 by regulating the power supply thereto.

Another temperature regulator 34 having a similar structure to that of the above temperature regulators 30 through 33 is connected to the specimen-temperature sensor 15. In the illustrated embodiment, the temperature regulator 34 has a setting device on which the desired level of the specimen temperature (see Table 1) is selectively set, so that the output from the specimen-temperature sensor 15 is compared against the thus set desired level thereof. Depending on the result of the comparison, the temperature regulator 34 controls the ON-OFF conditions of an electromagnetic switch $S_8$ which makes or breaks the common power circuit for all the infrared ray plate heaters 4A through 4D. Thus, if a certain specimen temperature is set on the temperature regulator 34, when the temperature of the meat or other food 3 is raised to the thus set specimen temperature while being processed in the second drying stage, the heating by the infrared ray plate heaters 4A through 4D is automatically interrupted and any excessive drying due to overheating is prevented.

To carry out the method of the invention by using the vacuum-drying equipment with infrared ray heating as illustrated in FIG. 1 and FIG. 2, meat or other food 3 to be dried, such as edible fresh meat or fresh mushrooms, is loaded on the tray 2 in the vacuum chamber 1 of FIG. 1. In the illustrated embodiment, the meat or other food 3 consists of a number of meat loaves, and the specimen-temperature sensor 15 and the meat temperature sensors 15A through 15E are inserted in the fresh meat loaves of the meat or other food 3. After the above preparation is completed, the refrigerator power source switch $S_2$ is turned on, so as to run the small hermetic refrigerator 9 for starting the cooling of the cold trap 6. Meanwhile, the Pirani gauge 27 is set at a desired degree of vacuum in the range of 1 Torr to 5 Torr. When the temperature of the cold trap 6 is reduced to below −35° C., the vacuum pump power source switch S₃ is turned on to run the vacuum pump 7. At the same time, the vacuum chamber evacuating valve 19 and the vacuum pressure regulator valve 22 are opened. Then, the temperature regulator 34 for preventing the overheating of the meat or other food 3 is set at a desired level in a range of +5° C. to +40° C. Finally, the desired heating-temperatures for the infrared ray plate heaters 4A through 4D are set on the temperature regulators 30 through 33 therefor in a range of +25° C. to 120° C.

When the meat or other food 3 is dried to the desired degree, the temperature regulator 34 automatically turns off the power supply to the infrared ray plate heaters 4A through 4D. After confirming the turning off of the switch S₈, the automatic vacuum regulator 10, the vacuum chamber evacuating valve 19, and the switch S₃ of the vacuum pump 7 are turned off, and the vacuum chamber leak valve 21 is opened for restoring the atmospheric pressure in the vacuum chamber 1. Then, the refrigerator power source switch S₂ is turned off and the door (not shown) of the vacuum chamber 1 is opened for removing the dried meat or other food 3 therefrom.

As described in detail in the foregoing, the method of producing the refreshable dry meat and other food according to the present invention uses infrared ray for freeze-drying meat under vacuum conditions, so that the following outstanding effects are achieved.

(1) The use of infrared rays having wavelengths of at least 5 microns for heating the frozen meat and other food under vacuum conditions causes uniform heating deep inside the meat and other food, and the vacuum-drying of the meat and other food at freezing temperatures is effected. Thus, the protein, fat and starch in the meat and other food, such as edible fresh-meat and other food, are retained even after drying without dissolution and denaturing, and only the moisture in the meat and other food is removed, so that refreshable dry meat and other food with porous texture is produced.

(2) Accordingly, the method of the invention produces refreshable dry meat and other food which can be restored to fresh meat simply by immersing it in water at room temperature, and the thus restored fresh meat and other food has substantially the same taste, flavor, toothsomeness, appearance, and texture as that before drying.

(3) The refreshable dry meat and other food produced by the method of the invention weighs only about one third to one fourth of raw meat and other food before drying, so that considerable saving in the transportation cost can be expected by the use of the method of the invention. Besides, if the refreshable dry meat and other food thus prepared is vacuum-packed with a fully airtight film, it can be preserved for a very long period of time, or semi-permanently, without necessitating any refrigerated storage. In short, the method of the invention has an outstandingly high automatic advantage.

(4) As compared with conventional methods of freezing meat requiring a very low freezing temperature of the meat, the method of the invention needs only 0° C. to −10° C., preferably −10° C. to −5° C. for meat and −5° C. to 0° C. for other foods which is higher than that of the conventional method of −20° C. to −40° C., so that the running cost of the equipment for carrying out the method of the invention is low. Thus, the method of the invention is economical in terms of the running cost.

Although the invention has been described with a certain degree of particularity, it is understood that the present disclosure has been made only by way of example, and that numerous changes in details of construction and the combination and arrangement of parts may be resorted to without departing from the scope of the invention as hereinafter claimed.

What is claimed is:

1. A method of producing refreshable dry food comprising the steps of
placing unfrozen raw food in a vacuum chamber;
reducing the pressure in said chamber to a value within the range 5 Torr to 1 Torr, thereby reducing the temperature to a value within the range of 0° C. to −10° C.;
irradiating the food with infrared energy having a wavelength of at least 5 microns; and
terminating said irradiation when said food reaches a temperature in the range +5° C. to +40° C. whereby said food is dried before its texture is adversely affected.

2. A method of producing refreshable dry food as defined in claim 1, wherein said food is selected from the group consisting of meats, seafood, vegetables, and edible wild plants.

3. A method of producing refreshable dry food as defined in claim 1, wherein said food is meat selected from the group consisting of beef, pork and mutton.

4. A method of producing refreshable dry food as defined in claim 1 wherein said food is seafood selected from the group consisting of raw shrimp, adductor muscle and fish meat.

5. A method of producing refreshable dry foods as defined in claim 1, wherein said food is a vegetable selected from the group consisting of potatoes and onions.

6. A method of producing refreshable dry foods as defined in claim 1, wherein said food is edible wild plants selected from mushrooms and bamboo shoots.

7. A method of producing refreshable dry meat, comprising the steps of
placing unfrozen meat to be dried on a shelf in a vacuum chamber having an infrared ray heater facing said shelf;
reducing the pressure in said chamber to a value within the range 5 Torr to 1 Torr, thereby reducing and maintaining the temperature at a value within the range of −5° C. to −10° C.;
freeze-drying said meat by irradiating it with infrared energy having a wavelength of at least 5 microns; and
terminating said irradiation when said meat reaches a temperature in the range +20° C. to +40° C. whereby said meat is dried before its texture is adversely affected.

8. A method of producing refreshable dry food comprising the steps of
placing unfrozen raw food in a vacuum chamber;
reducing the pressure in said chamber to a value within the range 3.16 Torr to 5 Torr, thereby reducing the temperature of said vacuum chamber to a value within the range of −5° C. to 0° C.;
vacuum freeze drying said food by irradiating it with infrared energy having a wavelength of at least 5 microns in said vacuum chamber, said vacuum chamber being maintained at a temperature within the range of −5° C. to 0° C.; and
terminating said irradiation when said food reaches a temperature in the range +5° C. to +20° C., whereby said food is dried before its texture is adversely affected.

* * * * *